2,949,442
PROCESS FOR PREPARING AMPHOTERIC COPOLYMERS AND THE RESULTING PRODUCTS

Alain Charles André Clavier, St. Maur les Fosses, and Jacques Pouradier, Bourg la Reine, France, assignors to Eastman Kodak Company, Rochester, N.Y., a corporation of New Jersey No Drawing. Filed May 4, 1955, Ser. No. 506,064

5 Claims. (Cl. 260—80.5)

The present invention relates to a method for preparing polymers of unsaturated amines and unsaturated acids, the polymers thus obtained and photographic products containing those polymers.

Gelatin is used on a large scale in the photographic industry, particularly for the preparation of photosensitive products. It enters, for example, into the making up of silver halide emulsion layers, filter layers, subbing layers, etc. The most characteristic properties of this substance are its exceptional ability to produce aqueous gels and its remarkable amphoteric properties due to the presence of acid groups and amine groups distributed on the polypeptide chain of the gelatin. However, because of its natural origin and the thus resultant variations of properties for lots of gelatin of different sources, much work has been done to try to substitute, in part or totally, a synthetic substance for gelatin, that would offer the advantageous properties of gelatin.

The present invention aims at the preparation of products that are particularly capable of replacing gelatin.

The principal objects of the invention are, on the one hand, a method for preparing high polymers, this process especially making it possible to obtain new amphoteric copolymers and, on the other hand, as industrial products, new amphoteric copolymers, certain ones of which display the phenomenon of thermoreversible gelification, all being compatible with gelatin and capable of forming mixtures with gelatin offering the same ability to form gels as similar solutions containing only gelatin.

The method according to the invention consists in mixing a polymerizable monomer having the formula

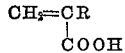

wherein R represents an atom of hydrogen or a methyl group, and a salt of a compound having the general formula

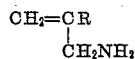

wherein R has the above-mentioned meaning, such as an allylamine salt, and in subjecting the mixture to polymerization in an inert atmosphere, at a temperature comprised between about 0 degrees C. and 80° C. Although allylamine, which is very stable under normal conditions, is known to inhibit polymerization and copolymerization, it has been found, according to the invention, that in the salt state, for example in the hydrochloride, sulfate, nitrate, etc. state, this compound is easily polymerized and quite easily copolymerized with other monomers, particularly with acrylic acid and methacrylic acid.

The copolymerization of allylamine salt, substituted or not, and acrylic or methacrylic acid, alone or together with other unsaturated compounds, can be accelerated by heat and by using polymerization catalysts known for the polymerization of compounds with a double ethylene linkage. The temperature may be comprised between 0° and 80° C., preferably between 0° and 40° C. As examples of polymerization catalysts, organic peroxides may be mentioned, such as lauroyl peroxide, hydrogen peroxide, perborates such as perborates of alkali metals and persulfates such as persulfates of alkali metals. Polymerization can be carried out in mass or in the presence of an inert diluent, such as water, although it is preferred to conduct the reaction in mass and away from the oxygen of the air.

The indicated monomers can be copolymerized with a third unsaturated monomer in an amount 0–20% of the total monomer used, such as an ethylene monomer that is copolymerizable with the two principal monomers. The third monomer may contain neither a basic group nor an acid group and may, for example, be vinyl acetate, vinyl chloride, acrylonitrile, methacrylonitrile, styrene, acrylates, methacrylates, acrylamide, methacrylamide, etc.

In addition, if so desired, the obtained copolymer may be submitted to various known chemical treatments, for example an acid hydrolysis to transform the ester groups of a copolymer containing polyvinyl ester groups into hydroxyl groups.

The method according to the invention is usable in a general way for preparing copolymers containing acid groups and free amine groups. However, more particularly, it makes it possible to prepare new copolymers that are remarkable in that they are made of macromolecules containing both repeating units having the formula (I)    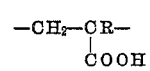

wherein R represents a hydrogen atom or a methyl group and repeating units having the formula (II)   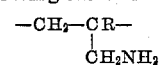

wherein R has the above-mentioned meaning, the repeating units I and II constitute together the major part of the macromolecule.

The macromolecules of the high polymer may also contain, in smaller quantity, repeating units corresponding to at least one other copolymerizable ethylene monomer. It is best that these repeating units correspond to the general formula

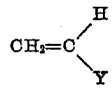

wherein Y represents a phenol group, a —CONH₂ group, a —CN group or an —OH group.

The new copolymers according to the invention present physical, mechanical and chemical properties that depend on the quantities of catalyst, on the reaction temperature and also, in the case of ternary copolymers, on the nature and percentage of the third monomer repeating unit. The new copolymers obtained are amphoteric owing to the acid groups introduced by the acrylic acid, substituted or not, and owing to the amine groups introduced by the allylamine, substituted or not. They are compatible with gelatin. The pH of the isoelectric point, which varies according to the conditions of preparation, is generally comprised between 2 and 8.

The amphoteric properties of the new copolymers according to the invention are particularly notable when the ratio of the amine groups to the acid groups attached to the chain is comprised between about 1:5 and 5:1.

The solubility of the high polymers according to the invention depends on the conditions of preparation and on the monomers used. Some, of relatively low molecular weight, are soluble in water whatever may be the pH value. Others, of higher molecular weight are practically insoluble in water within a broad range of pH values, comprised for example between 1 and 12. And then others congeal into a gel between certain pH values, the melting point of these gels depending on the preparation and on the pH, and the temperature being the maximum for a similar value of the pH of the isoelectric point. The addition of styrene reduces the solubility in water, and even makes it possible to obtain amphoteric substances of medium molecular weight that are insoluble in water. The addition of acrylonitrile, or vinyl acetate (hydrolyzed then to produce alcohol groups), acrylamide or methacrylamide, for example, make it possible to obtain gels that are more or less firm and more or less transparent, the melting points of which vary much less according to the pH values than do those of copolymers of acrylic acid and of allylamine.

The following non-restrictive examples describe some copolymers according to the invention and some methods for accomplishing their preparation. In these examples the parts are by weight unless otherwise indicated, and the temperatures are in degrees centigrade.

*Example I.—Copolymer of allylamine and methacrylic acid*

200 g. (2 mols) of slightly acid allylamine hydrochloride are put into a 2 liter flask that is provided with an agitator and placed in a thermostat controlled unit that is maintained at 0° by adding ice, and 500 mg. of potassium persulfate and 500 mg. of sodium metabisulfite are added. A current of nitrogen (1 ccm. per second) is passed through this, and the agitator is put into operation. By means of a dropping funnel, mounted on a tubulure of the flask, approximately 90 ccm. (1 mol) of 11 N methacrylic acid is added drop by drop over a period of a quarter of an hour. The dropping funnel is then removed, and the corresponding tubulure of the flask is plugged. The temperature is maintained at 0° for 48 hours and then is progressively raised about 10° per day up to 35° C. It is then left for three days, and 290 ccm. of a very viscous liquid is obtained that is transparent and very pale yellow in color.

If a concentrated solution of soda or caustic potash is added to the liquid obtained, a precipitate forms of the consistency of a gel. A further addition of potash causes the redissolving of the precipitate. If hydrochloric acid is added, the precipitate forms again, then redissolves. The precipitate, separated from the mother solution by successive dissolutions and reprecipitations, may be rid of excess monomers that have not reacted, as well as of polymers of low molecular weight and soluble impurities. It has all of the properties of a thermo-reversible gel; in particular, it can be rendered soluble by heating, the gel forming again by cooling.

*Example II.—Copolymer of allylamine, acrylic acid and acrylamide*

The same is done as in Example I, except that 20 parts of allylamine hydrochloride and 2 parts of acrylamide are put into the flask, and 8 parts of acrylic acid are added through the dropping funnel. The temperature reaches 40° at the end of polymerization. After purification, the compound obtained is absolutely translucent and forms a firm gel that is definitely less colored than gels of gelatin. The gel is difficultly solubilized at either high or low pH values. The gel can easily be tanned by means of formaldehyde for example, in order to obtain an insoluble gel.

This copolymer is compatible with gelatin to produce mixtures that may contain 30% gelatin or 30% copolymer.

*Example III.—Hydrolyzed copolymer of allylamine, methacrylic acid and vinyl acetate*

The same is done as in Example II, except that the acrylamide is replaced by 3 parts of vinyl acetate, and the acrylic acid by 9 parts of methacrylic acid. Polymerization is effected at pH 5, the vinyl acetate being in emulsion in the two other monomers. After completion of polymerization, the polymer is purified and the vinyl acetate groups are hydrolyzed as follows: 100 parts of 2 normal hydrochloric acid are added to the polymer solution and the mass is boiled for 2 hours. After cooling the partially hydrolyzed polymer is precipitated such as with acetone or ethyl alcohol, preferably the latter.

The hydrolyzed polymer obtained displays similar properties to those of the polymer described in Example II.

*Example IV.—Copolymer of allylamine, acrylic acid and styrene*

The same is done as in Example II except that the acrylamide is replaced by 5 parts of styrene. 0.02 part of benzoyl peroxide is used as catalyst. The polymer obtained is insoluble in water, but soluble in some organic solvents, such as acetone. The solutions may be coated on glass plates for example, and when dried, produce transparent films that are insoluble in water and are easily dyed.

*Example V.—Copolymer of allylamine, methacrylic acid and acrylonitrile*

The same is done as in Example I, except that 50 ccm. of acrylonitrile is added to the allylamine hydrochloride. At the end of polymerization a rather compact mass is obtained. After washing and drying the water-insoluble product obtained can be broken up into pieces. It has three pH values: One at pH 5.50, another at pH 7.30 and the third at pH 10.30.

According to their properties, the copolymers of the invention are capable of various uses. The ones of these polymers that are soluble in water can be used as substitutes for gelatin for the manufacture of silver halide photosensitive emulsions. These polymers can also be used as intermediate layers between the photosensitive emulsion layers with a gelatin binding agent and for other known photographic uses. The above-mentioned polymers finally obtained in Examples II and III are, for example, usable as substitutes for gelatin. These copolymers may also be tanned by means of common tanning agents for hides and gelatins, particularly by means of formaldehyde and chrome alum, and they then become insoluble in water.

Likewise, some of the polymers according to the invention may be used for preparing silver halide photosensitive emulsions by means of the known process of coagulation. The emulsion is rendered soluble by keeping the pH at a low or high value, then it is reprecipitated by adjusting the pH to about 7, which leaves in solution all of the soluble substances that were carried along with the emulsion in the course of the coagulation into gel and resulting from the action of the silver nitrate on the alkaline halide. A copolymer that can be used for this process is that which has been described in Example I.

Other polymers according to the invention that are soluble and insoluble in different mediums, can, owing to their amphoteric properties, be used as ion exchange resins in all of their applications. The polymer described in Example V may be mentioned as a polymer that can be used for this purpose.

Those polymers according to the invention that are not very soluble or are insoluble in water but soluble in some organic solvents can also be used for coating films. This is the case with the polymer described in Example IV. On the other hand, many of the copolymers according to the invention, particularly those that are not very soluble in water and have a relatively high melting point, can be used in an organic solvent for manufacturing textile fibers by spinning their solutions. The fibers obtained fix acid type colorants and basic type colorants particularly well by means of their basic and acid groups respectively. For example, very strong threads are obtained that have an excellent affinity for acid and basic colorants when a thick acetone solution of the polymer, the preparation of which is described in Example IV, is spun.

What we claim and desire to obtain by Letters Patent of the United States is:

1. A process for preparing an amphoteric copolymer which comprises mixing together unsaturated acid having the formula:

$$CH_2=CR$$
$$\quad\,\,|$$
$$\quad COOH$$

and a mineral acid salt of an amine having the formula:

$$CH_2=CR$$
$$\quad\,\,|$$
$$\quad CH_2NH_2$$

R being selected from the group consisting of hydrogen, halogen and methyl, in the molar ratio of approximately 2:1 amine salt to unsaturated acid and holding the mixture thus obtained in the presence of a catalyst from the group consisting of peroxide, perborate and persulfate polymerization catalyst at 0–80° C. in an inert atmosphere for a time sufficient to cause polymerization to occur.

2. A process for preparing an amphoteric copolymer which comprises mixing together unsaturated acid having the formula:

$$CH_2=CR$$
$$\quad\,\,|$$
$$\quad COOH$$

R being selected from the group consisting of hydrogen, halogen and methyl, and allylamine hydrochloride in the approximate ratio of 2 moles of the latter to 1 mole of unsaturated acid and holding the mixture in the presence of a polymerization catalyst selected from the group consisting of peroxide, perborate and persulfate copolymerization catalysts at 0–80° C. in an inert atmosphere for a time sufficient to cause polymerization of the mass.

3. A process for preparing an amphoteric copolymer which comprises mixing together unsaturated acid having the formula:

$$CH_2=CR$$
$$\quad\,\,|$$
$$\quad COOH$$

R being selected from the group consisting of hydrogen, halogen and methyl, and allylamine hydrochloride which comprises mixing together approximately 1 mole of unsaturated acid and 2 moles of allylamine hydrochloride together with potassium persulfate catalyst and holding the mixture at 0–80° C. in an inert atmosphere for a time sufficient to cause polymerization thereof.

4. A process for preparing an amphoteric copolymer which comprises mixing together unsaturated acid having the formula:

$$CH_2=CR$$
$$\quad\,\,|$$
$$\quad COOH$$

a mineral acid salt of an amine having the formula:

$$CH_2=CR$$
$$\quad\,\,|$$
$$\quad CH_2NH_2$$

R being selected from the group consisting of hydrogen, halogen and methyl and a copolymerizable ethylenic monomer, the unsaturated acid and amine salt being in the molar ratio og approximately 1:2, the amount of ethylenic monomer being 0–20% of the total monomer in the mixture and holding the mixture in the presence of a catalyst selected from the group consisting of peroxide, perborate and persulfate polymerization catalysts at 0–80° C. in an inert atmosphere for a time sufficient to cause polymerization thereof.

5. A process for preparing an amphoteric copolymer which comprises mixing together one mole of acid selected from the group consisting of acrylic acid and methacrylic acid and two moles of allylamine hydrochloride and holding the mixture in the presence of a catalyst selected from the group consisting of the peroxide, perborate and persulfate polymerization catalysts at 0–80° C. in an inert atmosphere for a time sufficient to cause polymerization of the mass.

References Cited in the file of this patent

UNITED STATES PATENTS

| | | |
|---|---|---|
| 2,456,428 | Parker | Dec. 14, 1948 |
| 2,461,023 | Barnes et al. | Feb. 8, 1949 |
| 2,498,792 | Cottet et al. | Feb. 28, 1950 |
| 2,548,186 | Wolf | Apr. 10, 1951 |
| 2,557,094 | Garber | June 19, 1951 |
| 2,579,016 | Schupp | Dec. 18, 1951 |
| 2,592,107 | Azorlosa | Apr. 8, 1952 |
| 2,599,494 | Sloan | June 3, 1952 |
| 2,611,763 | Jones | Sept. 23, 1952 |
| 2,662,875 | Chaney | Dec. 15, 1953 |